US012420796B2

(12) United States Patent
Muthusami et al.

(10) Patent No.: US 12,420,796 B2
(45) Date of Patent: Sep. 23, 2025

(54) VEHICLE CONTROL SYSTEM AND METHOD

(71) Applicant: Transportation IP Holdings, LLC, Norwalk, CT (US)

(72) Inventors: Srivallidevi Muthusami, Dallas, TX (US); Mahesh Babu Natarajan, Bangalore (IN); Jeremiah Dirnberger, Jacksonville, FL (US); Adam Franco, Melbourne, FL (US)

(73) Assignee: Transportation IP Holdings, LLC, Norwalk, CT (US)

( * ) Notice: Subject to any disclaimer, the term of this patent is extended or adjusted under 35 U.S.C. 154(b) by 59 days.

(21) Appl. No.: 17/504,965

(22) Filed: Oct. 19, 2021

(65) Prior Publication Data
US 2023/0120917 A1 Apr. 20, 2023

(51) Int. Cl.
| | |
|---|---|
| *B60W 30/18* | (2012.01) |
| *B60W 40/02* | (2006.01) |
| *B60W 40/12* | (2012.01) |
| *B60W 50/14* | (2020.01) |
| *B60W 60/00* | (2020.01) |
| *B60W 30/09* | (2012.01) |
| *B60W 30/095* | (2012.01) |

(52) U.S. Cl.
CPC ...... *B60W 30/18159* (2020.02); *B60W 40/02* (2013.01); *B60W 40/12* (2013.01); *B60W 50/14* (2013.01); *B60W 60/001* (2020.02); *B60W 30/09* (2013.01); *B60W 30/0953* (2013.01); *B60W 30/0956* (2013.01); *B60W 2520/00* (2013.01); *B60W 2554/404* (2020.02)

(58) Field of Classification Search
CPC ...... B60W 40/02; B60W 40/12; B60W 50/14; B60W 60/001; B60W 30/09; B60W 30/0953; B60W 30/0956; B60W 2520/00; B60W 2554/404
See application file for complete search history.

(56) References Cited

U.S. PATENT DOCUMENTS

| | | | |
|---|---|---|---|
| 7,813,846 B2 | 10/2010 | Wills et al. | |
| 2008/0033605 A1* | 2/2008 | Daum | B61L 27/16 701/19 |
| 2013/0131909 A1 | 5/2013 | Cooper et al. | |
| 2021/0157315 A1* | 5/2021 | Wray | G05D 1/0212 |
| 2021/0233396 A1* | 7/2021 | Guo | G08G 1/087 |

FOREIGN PATENT DOCUMENTS

| | | | | |
|---|---|---|---|---|
| DE | 102018129029 | * | 5/2019 | ............ G08G 1/166 |
| JP | 4317000 | * | 8/2009 | ............ G01C 21/00 |

OTHER PUBLICATIONS

National Transportation Safety Board "Preliminary Report RRD21FR008" La Mirada, California, Mar. 3, 2021 (3 pages).

* cited by examiner

*Primary Examiner* — Joan T Goodbody
(74) *Attorney, Agent, or Firm* — K&L Gates LLP

(57) ABSTRACT

A vehicle control system and method includes obtaining a size of a vehicle system, identifying locations of different portions of the vehicle system, and determining one or more of a) whether the vehicle system is disposed within or across an intersection of routes or b) a predicted time of arrival at which the vehicle system will be disposed within or across the intersection based on the size of the vehicle system and the locations of the different portions of the vehicle system.

18 Claims, 5 Drawing Sheets

VEHICLE CONTROL SYSTEM AND METHOD

BACKGROUND

Technical Field

The subject matter described herein relates to a vehicle control system and related method.

Discussion of Art

In areas of vehicle and route congestion, such as rail yards, marine ports, cities, etc., plural different vehicles may move along plural different routes that may intersect with each other at multiple intersections. Vehicles, obstacles, pedestrians, or the like, may move through the intersections, or may remain positioned across the intersections. In order for the multiple vehicles to safely move through an intersection, the vehicles need to have an understanding of when an intersection is free of another vehicle, obstacle, or pedestrian, and when the intersection is not, such as when another vehicle is disposed across the intersection. Additionally, the vehicles need to have an understanding of when all of the other vehicle system and/or other vehicle systems have moved out of the intersection.

For example, a first vehicle system approaching an intersection may be aware that a second vehicle system is moving through the intersection. However, the second vehicle system may include plural vehicles that travel together, and the first vehicle system may only have information related to a location of a lead vehicle of the second vehicle system. For example, the first vehicle system may receive information that indicates that the lead vehicle of the second vehicle system has moved out of the intersection, but the first vehicle system may be unaware that a trailing vehicle of the second vehicle system, or a portion of the trailing vehicle of the second vehicle system is disposed across the intersection or within an intersection allowance area. The first vehicle system may continue moving according to original operating conditions and may collide with the portion of the trailing vehicle of the second vehicle system that remains disposed across the intersection.

As another example, a stationary obstacle may be positioned near an intersection the first vehicle system is approaching. The first vehicle system may be aware where the obstacle is positioned, but may be unaware of the size of the obstacle. For example, the obstacle may have a size such that a portion of the obstacle may extend into the intersection allowance area. The first vehicle system may collide with the portion of the obstacle that extends into allowance area of the intersection based on the size of the obstacle and/or the size of the first vehicle system. For example, the first vehicle system may be unable to gauge a distance between the obstacle and the first vehicle system to a level of accuracy to avoid collision with the obstacle.

Therefore, a need exists for a monitoring and control system that understands locations of all portions of vehicle systems and obstacles that move along and/or are disposed at locations along intersecting routes, to avoid collisions between vehicles, obstacles, pedestrians, or the like.

BRIEF DESCRIPTION

In one or more embodiments, a method includes obtaining a size of a vehicle system, identifying locations of different portions of the vehicle system, and determining one or more of a) whether the vehicle system is disposed within or across an intersection of routes or b) a predicted time of arrival at which the vehicle system will be disposed within or across the intersection based on the size of the vehicle system and the locations of the different portions of the vehicle system.

In one or more embodiments, a system includes a controller comprising one or more processors that may obtain a size of a vehicle system. The processors identify locations of different portions of the vehicle system, and determine one or more of a) whether the vehicle system is disposed within or across an intersection of routes or b) a predicted time of arrival at which the vehicle system will be disposed within or across the intersection based on the size of the vehicle system and the locations of the different portions of the vehicle system.

In one or more embodiments, a method includes identifying locations of different portions of a first vehicle system, identifying a location of an intersection allowance area of routes that includes an intersection of the routes and a threshold distance around the intersection, and obtaining a speed of movement of the first vehicle system and a speed of movement of a second vehicle system. The method may include determining whether at least one or more different portions of the first vehicle system is disposed within the intersection allowance area, and determining a) a predicted time of arrival at which the second vehicle system will be disposed within the intersection allowance area and b) a predicted time of departure at which the at least one of the different portions of the first vehicle system will move out of the intersection allowance area based on one or more of the location of the intersection allowance area, the speed of movement of the first vehicle system, or a speed of movement of the second vehicle system responsive to determining that at least one of the different portions of the first vehicle system is disposed within the intersection allowance area. One or more operating settings of one or more of the first vehicle system or the second vehicle system may be changed to one or more of a) move the first vehicle system out of the intersection allowance area, or b) change the predicted time of arrival at which the second vehicle system will be disposed within or across the intersection.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
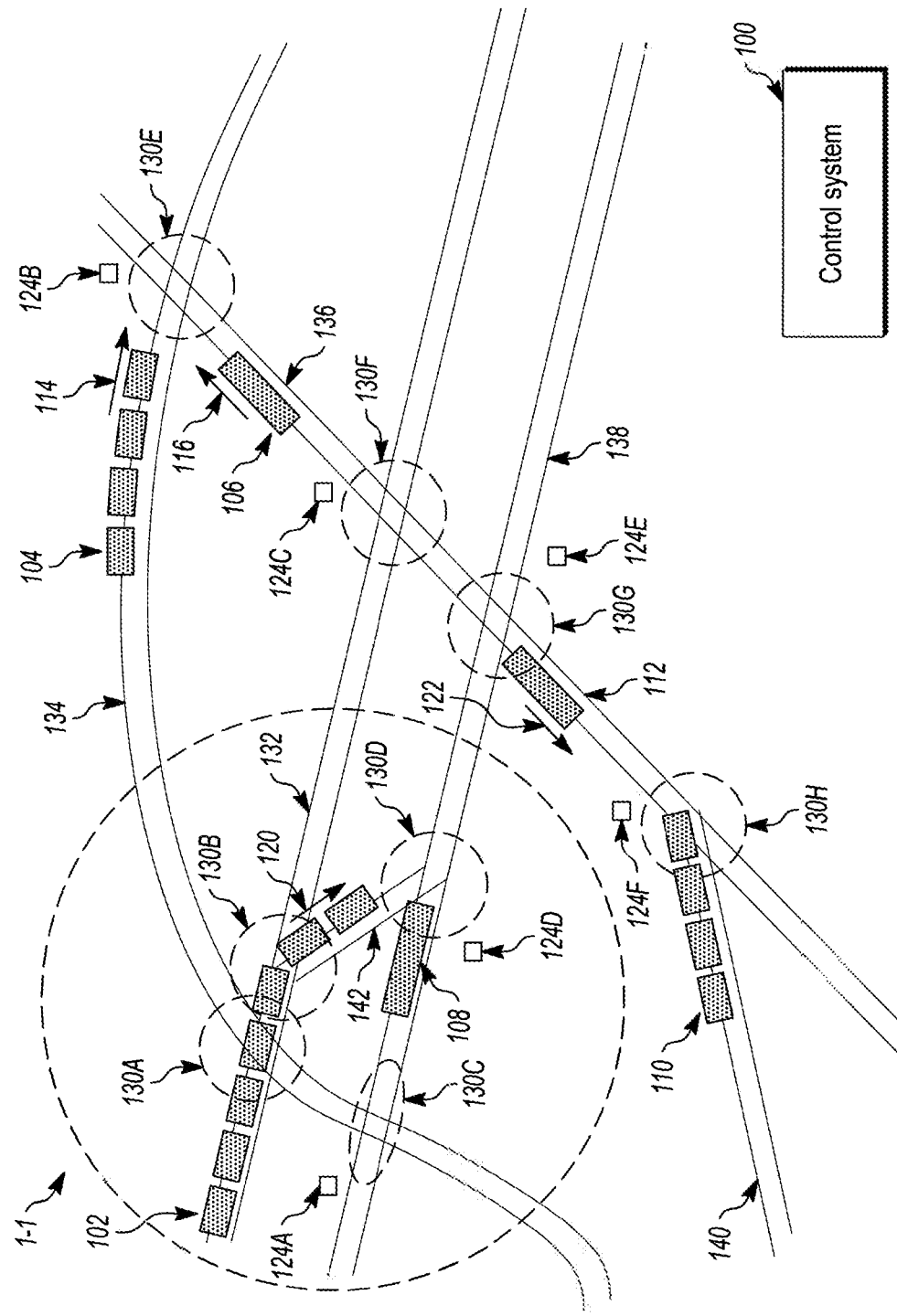
FIG. 1 illustrates a schematic of plural vehicle systems moving along routes in accordance with one embodiment.

Embodiments of the subject matter described herein relate to a vehicle control system and method of operation. The vehicle control system may monitor intersections of intersecting routes, and movement of plural different vehicle systems that move along and/or disposed at locations along the intersecting routes. In one or more embodiments, the control system may monitor movement of plural different vehicle system that move along plural different routes. For example, the control system may remotely monitor a rail yard, a marine port, an area of a city that include plural paved roads intersecting each other, a parking lot, or the like.

The control system may determine whether a portion of a vehicle system is disposed within or across an intersection, or within an intersection allowance area that includes a threshold distance around the intersection. The portion of the vehicle system may be a front end or a rear end of the vehicle system, may be a corner or side of the vehicle system, may be a portion of a cargo being carried by the vehicle system that extends beyond the size of the vehicle system, or the like. The determination may be made based on one or more of a size of the vehicle system, locations of different portions of the vehicle system, a location of the intersection, a size and/or location of the intersection allowance area, a speed of movement of the vehicle system, or the like.

In one or more embodiments, the vehicle systems may be formed from rail vehicles (e.g., locomotives, transit vehicles, rail cars, etc.), automobiles, trucks, buses, mining vehicles, agricultural equipment, marine vessels, aircraft (manned or unmanned), or the like. In one or more embodiments, one of the vehicle systems may include two or more vehicles that travel together along a route, such as a consist, convoy, swarm, platoon, fleet, or the like. At least one of the vehicles may be a propulsion-generating vehicle, and one or more other vehicles optionally may be non-propulsion generating vehicles. As one example, the vehicle system may be a train consist that includes a propulsion-generating locomotive and plural rail cars that move together along a rail track. The control system may determine whether any portion of one or more rail cars or the locomotive is disposed across an intersection or within an intersection allowance area. As another example, the vehicle system may be a semi-trailer truck that is coupled with one or more trailers. The control system may determine whether a portion of one or more of the trailers or the truck is disposed across an intersection or within an intersection allowance area. Optionally, the vehicle system may include a barge that is propelled by another marine vessel such as a barge, may be an agricultural vehicle (e.g., a tractor) that is coupled with and propels one or more trailers, or the like. In another example, a vehicle system may be formed from plural vehicles that travel together (e.g., as a convoy), but that are not mechanically coupled with each other.

If it is determined that a portion of a vehicle system is disposed across an intersection or within an intersection allowance area, the control system may determine whether the portion of the vehicle system needs to move to a location outside of the intersection and/or intersection allowance area. For example, the portion of the vehicle system may need to move out of the intersection allowance area if another vehicle system is approaching the intersection. The control system may automatically communicate a command message to the vehicle system to direct the vehicle system to change an operating setting of the vehicle system to move the vehicle system out of the intersection allowance area.

Optionally, the control system may automatically communicate an alert to the vehicle system (e.g., to an operator of the vehicle system) indicating that a portion of the vehicle is positioned within the intersection allowance area or across the intersection. For example, the operator may be unaware that a portion of the vehicle system is disposed within the intersection allowance area, and the alert may be a notification to the operator. Optionally, the control system may communicate an alert to another vehicle system, such as another vehicle system that is moving in a direction toward the intersection. The alert to the other vehicle system may include instructions to change an operating setting of the other vehicle system to change a time of arrival at the intersection. Optionally, the alert may direct the other vehicle system to move onto another route, to move in another direction (e.g., in a direction away from the intersection), or the like.

If it is determined that a portion of the vehicle system is not disposed within the intersection allowance area or across the intersection, the control system may determine a predicted time of arrival at which the vehicle system will be disposed within the intersection allowance area or across the intersection. In one embodiment, the control system may determine that the predicted time of arrival of the vehicle system at the intersection may need to change. The control system may automatically communicate a command message to the vehicle system to automatically change an operating setting of the vehicle system to change the predicted time of arrival of the vehicle system at the intersection. The time of arrival may need to change based on another vehicle system being disposed within the intersection allowance area or across the intersection, based on another obstacle (e.g., barrier, debris, pedestrian, or the like) being disposed within the intersection allowance area, or the like.

FIG. 1 illustrates a schematic of plural vehicle systems moving along and/or being disposed on plural different routes. In the illustrated embodiment, a first vehicle system 102 moves in a first direction 120, a second vehicle system 104 moves in a second direction 114, a third vehicle system 106 moves in a third direction 116, a fourth vehicle system 108 is a stationary object, a fifth vehicle system 110 is a stationary object or vehicle, and a sixth vehicle system 112 moves in a sixth direction 122. Optionally, one of the vehicle systems may represent a person or object moving along one or more routes, such as a pedestrian moving along a walkway. For example, some of the objects may be automobiles or other non-rail vehicles moving along roads, other objects may represent pedestrians moving along sidewalks or other designated walking areas, other objects may represent stationary objects such as obstructing objects that may be blocking some of the routes, or the like.

In one embodiment, the schematic illustrated in FIG. 1 may represent a vehicle yard, such as a train or rail yard, and the first, second, third, fourth, fifth, and/or sixth vehicle systems may represent rail vehicles moving along or positioned on different rail routes. In another embodiment, the schematic may represent an area being monitored that includes plural different types of objects moving along different types of routes. For example, some of the vehicle systems may represent rail vehicle systems, some vehicle system may represent non-rail vehicle systems (e.g., automobiles, trucks, buses, mining vehicles, agricultural vehicles, or other off-highway vehicles) moving along routes that may intersect routes of the rail vehicle systems. In another embodiment, one or more of the vehicle systems may represent marine vessels or aircrafts, which may move along waterways and flightpaths, respectively.

In one embodiment, one or more of the vehicle systems may include two or more vehicles that may travel together (e.g. by being mechanically coupled or by being mechanically separate but logically coupled and communicating with each other to travel together, such as in a convoy or a locomotive consist where multiple locomotives communicate and operate together as a train). At least one vehicle of the vehicle system may be a propulsion-generating vehicle, and optionally the vehicle system may include one or more non-propulsion generating vehicles.

In the illustrated embodiment, vehicle systems may move in various directions along a first route 132, a second route 134, a third route 136, a fourth route 138, a fifth route 140, and a sixth route 142. The first and second routes intersect with each other at a first intersection 130A, the first and sixth routes intersect with each other at a second intersection 130B, the second and fourth routes intersect with each other at a third intersection 130C, the fourth and seventh routes intersect with each other at a fourth intersection 130D, the second and third routes intersect each other at a fifth intersection 130E, the first and third routes intersect each other at a sixth intersection 130F, the third and fourth routes intersect with each other at a seventh intersection 130G, and the third and fifth routes intersect with each other at an eighth intersection 130H. Optionally, the routes may define other or different pathways on which vehicles or other objects may move, and may intersect with other routes in any alternative configuration. For example, FIG. 1 is for illustrative purposes only and may have an alternative configuration of intersecting routes, and alternative arrangements of vehicles and/or objects moving along the different intersecting routes.

Figure 2:
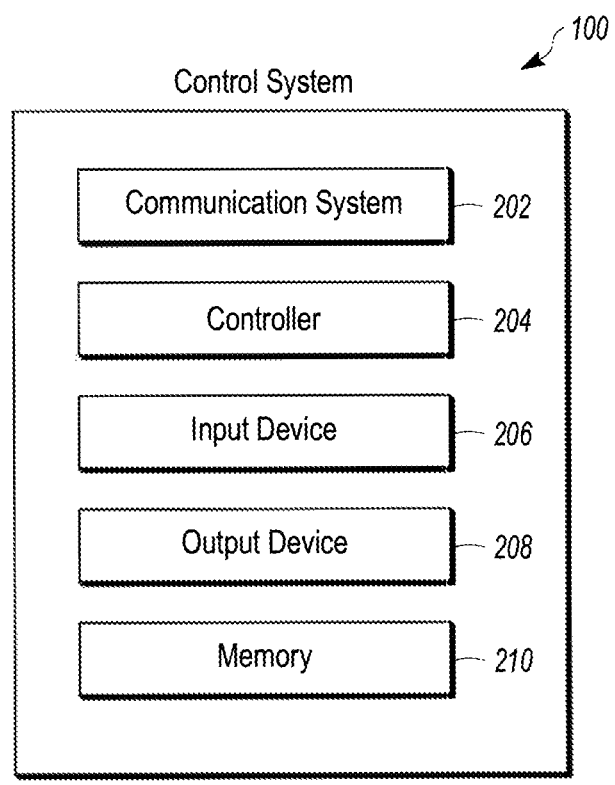
FIG. 2 illustrates a control system in accordance with one embodiment.

A control system 100 may monitor one or more vehicle systems moving along the routes and/or one or more intersections of two or more routes. The control system may be disposed off-board the vehicle systems. FIG. 2 illustrates a schematic of the control system in accordance with one embodiment. The control system may represent a control module, and can include a controller 204 that can include one or more processors, microcontrollers, or other logic-based devices and/or associated software or instructions, for carrying out one or more operations described herein.

The control system may be manually operated by receiving instruction signals from an input device 206 (e.g., a device that receives input from an operator such as, but not limited to, a touchscreen, a joystick, a keyboard, a switch, a wheel, a microphone, or the like) based on manually input from an operator at the input device. An output device 208 can provide information to the operator, such as locations of vehicle systems moving along different routes, operating settings or operating conditions of the different vehicle systems (e.g., speed, brake settings, direction of movement, or the like). The control system may include a memory 210 or other data storage device. Optionally, the control system may be communicably coupled with other storage databases (e.g., other memory devices of other systems, data storage cloud systems, or the like).

The control system includes a communication system 202 that may be setup for one or both of wired or wireless communication. For example, the communication system can represent transceiving circuitry, one or more antennas, modems, communication cables, or the like. The communication system may communication (e.g., receive and/or provide data signals) with a controller onboard one or more of the vehicle systems, with another off-board controller, with one or more wayside devices 124A-F, with one or more traffic control devices (e.g., traffic lights, barriers, rail crossing gates, or the like), or the like.

In one embodiment, the communication system can interact with other systems via one or more communication types. Suitable communication types can include, but are not limited to, cellular networks (e.g., the Global System for Mobile Communications (GSM)), mesh networks using Ethernet standards, wireless communication protocols (e.g., Bluetooth), radio and shortwave communication types, or the like. In one or more embodiments, where two or more communication types are present, the communication system may translate some or all of a data stream from one type to another. Similarly, different data protocols may be used. Such translation may allow the communication system to act as a transference point for data transmission. The translation may allow for different types of equipment (e.g., first and second vehicle systems may each use communication types different from each other to communicate with each other via the communication system). The communication system may switch types, protocols, and/or communication pathways in response to delegation of signal or failure of one pathway. This may provide redundancy of communication by the communication system. In one embodiment, the communication system may decrypt, decompile, or disaggregate information, parse information, and send along all or part of a message (e.g., alone or combined with new data, or with encryption, or both). The communication system may be the same as or similar to other communication devices or communication systems described herein.

In one or more embodiments, the control system may represent a back-office server or a dispatch center, such as of a positive vehicle control (PVC) system. A PVC system is a control system in which a vehicle is allowed to move, and/or is allowed to move outside a designated restricted manner (such as above a designated penalty speed limit), only responsive to receipt or continued receipt of one or more signals (e.g., received from off-board the vehicle system) that meet designated criteria, the signals have designated characteristics (e.g., a designated waveform and/or content) and/or are received at designated times (or according to other designated time criteria) and/or under designated conditions. This is opposed to 'negative' vehicle control systems where a vehicle system is allowed to move unless a signal (restricting movement) is received. The back-office server may be a vital or a non-vital system such that data stored, contained, maintained, communicated between, or the like, may be vital (e.g., protected) and/or non-vital (e.g., non-protected) data. Alternatively, the off-board control system represents another computerized system that communicates with vehicles and/or vehicle systems described herein.

Figure 3:
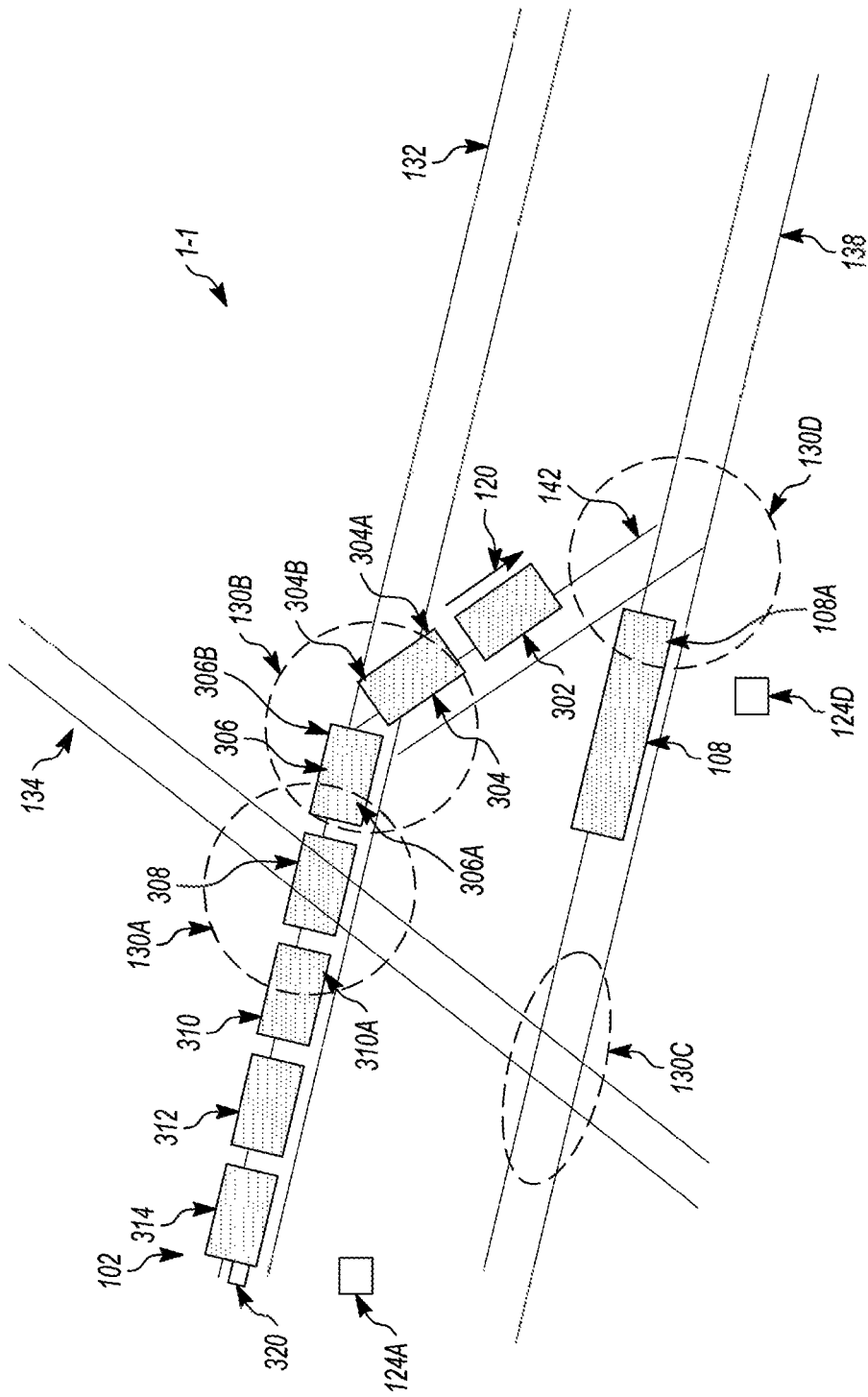
FIG. 3 illustrates a magnified view of a portion of the schematic shown in FIG. 1.

FIG. 3 illustrates a magnified view of a portion 1-1 of the schematic shown in FIG. 1. The view illustrates the first vehicle system 102 that includes plural vehicles (e.g., first vehicle 302, second vehicle 304, third vehicle 306, fourth vehicle 308, fifth vehicle 310, sixth vehicle 312, and seventh vehicle 314) that move together in the first direction 120. The first vehicle system moves along the first route 132 and then moves onto the sixth route 142 at the intersection 130B in the first direction. For example, the first and second vehicles moves along the sixth route and the third, fourth, fifth, sixth, and seventh vehicles move along the first route prior to reaching the intersection. As the first vehicle system moves toward the intersection 130B, the vehicles of the first vehicle system move through the intersection 130A between the first route 132 and the second route 134. Additionally, the sixth route intersects with the fourth route 138 at the intersection 130D. In the illustrated embodiment, the fourth vehicle system 108 is disposed within or at the intersection between the fourth and sixth routes.

The control system may monitor movement and/or positions of the plural different vehicle systems. Additionally, the control system may monitor locations of different portions of the plural different vehicle systems relative to intersections between routes. As one example, the control system may monitor movement and/or placement of vehicle systems relative to route intersections to ensure that one vehicle system may not interfere with or run into another vehicle system.

Figure 4:
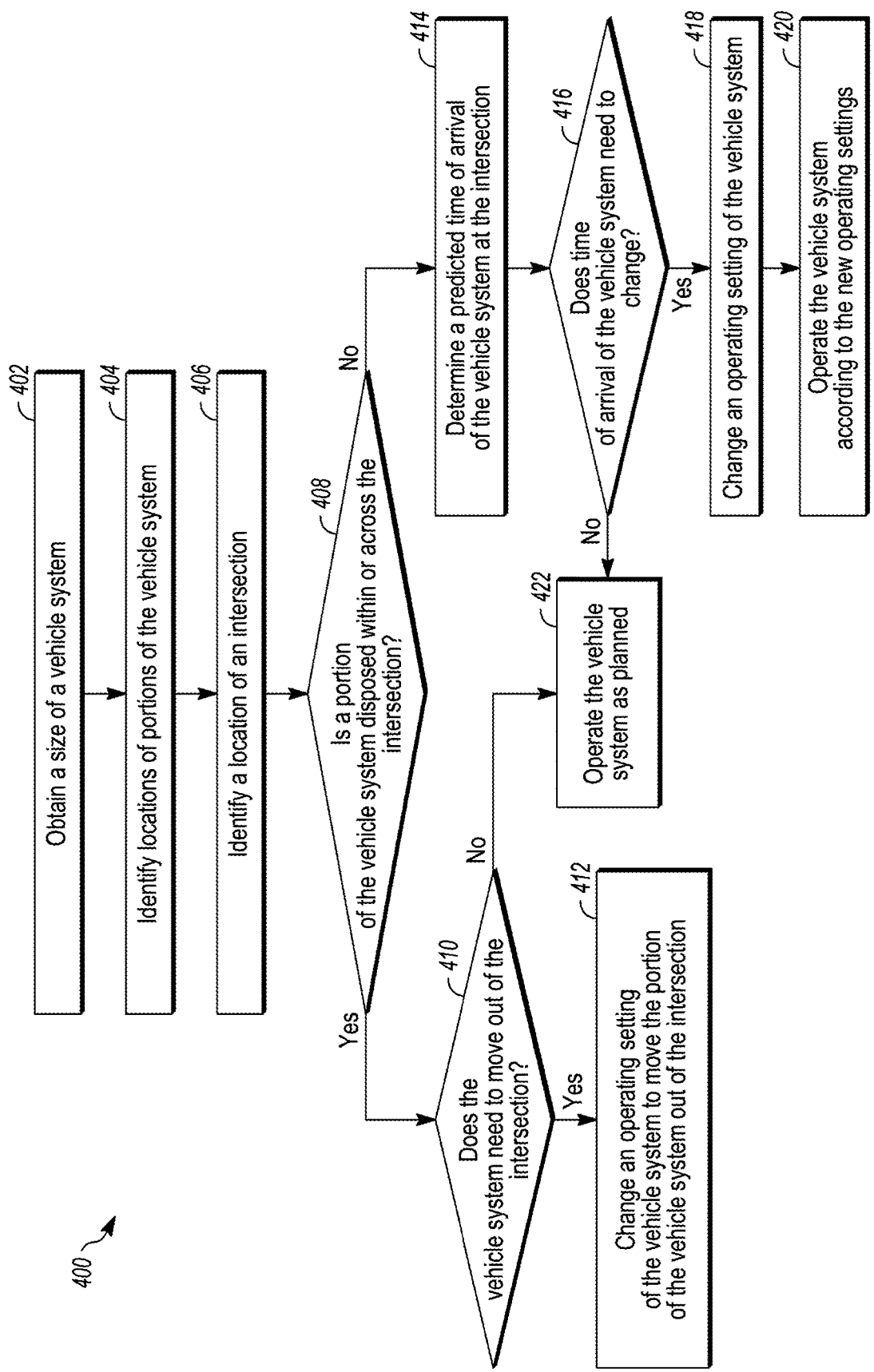
FIG. 4 illustrates a flowchart of one example of controlling movement of a vehicle system in accordance with one embodiment.

FIG. 4 illustrates a flowchart 400 of one example of controlling movement of a vehicle system, such as the first vehicle system 102 shown in FIGS. 1 and 3. At step 402, the control system obtains a size of the first vehicle system. In one embodiment, the size of the vehicle system may include or indicate one or more of a length of the vehicle system (e.g., from a front end of a first vehicle to a rear end of a last vehicle of a vehicle consist, from a first end to a rear end of a single vehicle system, or the like), a number of vehicles included in the vehicle system (e.g., the first vehicle system includes seven vehicles but include more or less than seven vehicles), a length of each individual vehicle of the vehicle system (e.g., one or more vehicles may have a length that is different than a length of other vehicles of the vehicle system), an amount of slack between adjacent vehicles of the vehicle system, or the like. In another embodiment, the size of the vehicle system may include a width or a height of the vehicles that form the vehicle system. In one embodiment, the size may be a volume. And, in one embodiment, the size may include the cargo or equipment carried by the vehicle in the vehicle system, or a combination of the vehicle system and its cargo or equipment. For example, a height measurement may include a flatbed, a first cargo container, and a second, stacked cargo container; or a width may include a width of a rail car plus the width of an oversized cargo item being carried on the rail car.

The control system may receive or obtain the size of the vehicle system from the first vehicle system, from the memory of the control system, from another off-board database, from a wayside device (e.g., a sensor disposed onto or coupled with the wayside device may detect a first end of the vehicle and a second end of the vehicle responsive to the vehicle moving past the sensor), from another vehicle system, or the like. In another embodiment, the control system may obtain a size of the vehicle system based on data from sensors onboard a first vehicle 302 of the vehicle system (e.g., global positioning system, or the like) and data from sensors onboard a last or seventh vehicle 314 of the vehicle system (e.g., an end-of-train or end-of-vehicle transferable device may be coupled with the seventh or last vehicle of the vehicle system and may include global positioning systems or other position sensors).

In one or more embodiments, the size of the vehicle system may include or indicate a three-dimensional size of the vehicle system. For example, the control system may obtain a height of each of the vehicles, a width of each of the vehicles, and a length of each of the vehicles of the first vehicle system. Optionally, the size of the vehicle system may include a size of oversized cargo the first vehicle system (or one or more vehicles of the first vehicle system) may be carrying. For example, the first vehicle 302 may have a height, width, and length, but the cargo disposed onboard the first vehicle may have a height, width, and/or length that is greater than one or more of the height, width, or length of the first vehicle such that the size of the cargo is greater than the size of the first vehicle in one or more directions.

At step 404, the control system may identify locations of portions of the vehicle system. The different portions of the vehicle system may include locations of corners, sides, top portions and bottom portions of the different vehicles of the vehicle system. Optionally, the different portions may include locations of components (e.g., wheels, hitches or other coupling devices, bumpers, tail gates, operator cab positions, cargo loading and unloading components, doors or windows, or the like) of the different vehicles of the vehicle system.

The control system may identify locations of different portions of the vehicle system based on the positioning information of the first vehicle system and the size of the first vehicle system. For example, the control system may identify locations of each of the first vehicle system, the second vehicle system, the third vehicle system, the fourth vehicle system, the fifth vehicle system, and the sixth vehicle system illustrated in FIG. 1. In one or more embodiments, the control system may obtain information associated with the size of the first vehicle system indicating that the first vehicle system includes seven vehicles (e.g., vehicles 302 through 314) moving together. The size of the first vehicle system may be indicative of a total length of the first vehicle system (e.g., from the first vehicle 302 to the seventh vehicle 314), a location of the first vehicle of the first vehicle system, and a location of the seventh or last vehicle of the first vehicle system. Optionally, the control system may obtain information about the route(s) along which the vehicle system is moving. For example, the control system may receive information that the vehicle system is positioned along a curve of the route, that the vehicle system is at an intersection between two routes, that some vehicles of the vehicle system are on the route and other vehicles have moved or turned onto an intersecting route, or the like).

In one or more embodiments, the control system may identify locations of each of the vehicles of the first vehicle system based on the information of the length of the first vehicle system, the route(s) along which the first vehicle system is moving or disposed on, and locations of the first and seventh vehicles. For example, the control system may determine a location of each of the second, third, fourth, and fifth vehicles based on information related to the size of the vehicle system, the route, and the locations of the first and seventh vehicles. The locations of each of the other vehicles of the first vehicle system may be determined within a 5% area of the actual locations of each of the other vehicles, within a 10% area of the actual locations, or the like.

At step 406, the control system may identify a location of an intersection or an intersection allowance area. For example, the control system may identify locations of each of the intersections 130A-H shown in FIG. 1. The intersection may be between two routes that may be the same type (e.g., two rail tracks such as at a switch location) or different types of routes (e.g., a paved road that intersects with another paved road or a rail track). The control system may identify locations of each of the intersections based on topographical information, maps, charts, site plans, or the like, stored in the memory of the control system or stored in another data storage device that is accessible by the control system. Optionally, the control system may identify the locations of the intersections based on information received from one or more wayside devices, from one or more of the vehicle systems, from satellite images, or the like.

The intersection allowance area may be an area of a threshold distance around the intersection. For example, the intersection allowance area may be defined as an area that is within about 1 meter of the intersection, within about 5 meters of the intersection, within about 10 meters of the intersection, within about 25 meters of the intersection, or the like. For example, the control system may identify the location of the intersection (e.g., where the routes cross each other) and the area that is within a 10 meter diameter perimeter of the intersection, a 5 meter diameter perimeter of the intersection, or the like. The intersection allowance area may be a substantially circular area that extends around the intersection, or alternatively may be have an alternative shape. For example, the intersection allowance area may have an oblong or oval shape such that the allowance area includes an area of one route that is greater than an area of the intersecting route, such as the intersection allowance area of the intersection 130C shown in FIGS. 1 and 3. The size of the intersection allowance area of a first intersection may be substantially the same or different than the size of the intersection allowance area of a second intersection.

In one or more embodiments, the control system may be monitoring plural different routes that form or create plural different intersections. The control system may monitor and/or identify locations of one or more of the different intersections. For example, the control system may identify locations of intersections of plural different routes in which routes intersects with similar or dissimilar types of routes (e.g., tracks, paved roads, unpaved roads, pedestrian walkways, or the like). Optionally, the control system may only identify locations of intersections of similar routes (e.g., rail tracks intersecting other rail tracks, or paved roads intersecting other paved roads).

At step 408, a determination is made whether a portion of the vehicle system (or a portion of the cargo being transported by the vehicle system) is disposed within or across the intersection or intersection allowance area. For example, returning to FIG. 3, the control system may determine that a portion of the first vehicle system 102 is disposed within or across the intersection 130A, and another portion of the first vehicle system is disposed within the intersection 130B. For example, the control system may identify the location of the intersection 130A, and may determine that a portion 310A of the fifth vehicle 310, the fourth vehicle 308, and a portion 306A of the third vehicle are disposed within the intersection 130A between the first route 132 and the second route 134. Additionally, the control system may determine that all of the third vehicle 306 and all of the second vehicle 304 are disposed within the intersection 130B between the first route and the sixth route 142. Additionally, the control system may determine that a portion 108A of the fourth vehicle system 108 is disposed within the intersection 130D between the fourth route 138 and the sixth route 142.

In one or more embodiments, the output device of the control system may indicate to an operator of the control system that a portion of one or more vehicle systems, a portion of another obstacle, or the like, is disposed within or across an intersection or intersection allowance area. For example, the output device may be a digital screen, touch screen, or the like (e.g., of a stationary terminal, or of a wireless mobile device such as a tablet or smartphone), and may include a map of the intersecting routes. The map may include an indication of locations of each of the vehicles of the plural different vehicle systems, locations of obstacles, and an indication of portions of the vehicles or obstacles that may be disposed within or across an intersection. For example, the output device may display a mark, a dot, a star, a text, an arrow, a flag, or other indication (e.g., in a designated color) that a portion of the vehicle system is disposed within the intersection. Optionally, the output device may indicate a location of the portion of the vehicle system (e.g., a front left corner of a vehicle of the vehicle system, a rear end of a vehicle, or the like). In one or more embodiments, respective indications may be displayed for all vehicle systems disposed within respective intersections or intersection allowance areas, for the operator of the control system to understand multiple such instances of vehicle positioning within a rail yard or other designated region of transportation routes. Optionally, the output device may be and/or include an audio output device that may sound an audio alarm based on a determination that a portion of a vehicle system is disposed within an intersection or intersection allowance area.

In one or more embodiments, an output device disposed onboard a vehicle system (not shown) may indicate to an operator onboard the vehicle system that a portion of a vehicle of the vehicle system is disposed within or across an intersection or intersection allowance area. For example, the output device onboard the vehicle system may indicate to the operator onboard the vehicle system that a portion of the vehicle is within the intersection allowance area, and may indicate which portion of the vehicle is disposed within the intersection allowance area (e.g., a rear corner, a front end, or the like). Optionally, the output device onboard the vehicle system and/or the output device of the control system may indicate how far a distance within the intersection allowance area the portion of the vehicle system extends (e.g., extends 1 meter into the intersection allowance area, 10% of the vehicle extends into the intersection allowance area, or the like).

In one or more embodiments, the control system may automatically communicate an alert to one or more vehicle systems responsive to determining that a portion of a vehicle system disposed within or across an intersection or intersection allowance area. For example, the control system may determine that the portions of the first vehicle system are disposed within the intersection allowance area of the intersections 130A and 130B, and may communicate an alert to the operator of the first vehicle system. Optionally, the control system may communicate an alert to the fourth vehicle system based on a direction of movement of the first vehicle system toward the fourth vehicle system. Optionally, the control system may communicate alerts to vehicle systems that may be moving toward the first vehicle system (e.g., on the first route or other routes that intersect the first route), to other vehicle systems that are moving along the same route as the first vehicle system or other routes that intersect the first route), or the like. Optionally, the control system may communicate alerts to vehicle systems within a determined relative area around the first vehicle system regardless of a direction of travel and/or routes along which the other vehicle systems may be moving (e.g., to vehicle systems within 100 meters of the first vehicle system, vehicle systems within 500 meters of the first vehicle system, or the like).

If a portion of a vehicle system is disposed within or across an intersection or intersection allowance area, flow of the method proceeds toward step 410. Alternatively, if no portion of a vehicle system is disposed within or across an intersection or intersection allowance area, flow of the method proceeds toward step 414.

At step 410, a determination is made whether the portion of the vehicle that is disposed within or across an intersection or an intersection allowance area needs to move out of the intersection or intersection allowance area. As one example, the vehicle system may need to move out of the intersection if another vehicle system or other object or obstacle is disposed at or approaching the intersection. As another example, the vehicle system may need to move out of the intersection or intersection allowance area if another vehicle system or other object is planned or scheduled to move through the intersection. For example, referring to FIG. 3, the control system may determine that the portion 108A of the fourth vehicle system may need to move out of the intersection 130D based on the first vehicle system moving in the first direction 120 toward the intersection. If the portion of the vehicle system within the intersection needs to move out of the intersection, flow of the method proceeds toward step 412. Alternatively, if the portion of the vehicle system does not need to move out of the intersection, flow of the method proceeds toward step 422.

At step 412, an operating setting of the vehicle system may be changed to move the portion of the vehicle system out of the intersection. For example, the illustrated embodiment of FIG. 3, the fourth vehicle system 108 is stationary such that the fourth vehicle system is not moving in any direction along the fourth route. If the control system determines, however, that the portion 108A of the fourth vehicle system needs to move out of the intersection allowance area of the intersection 130D, the control system may communicate a command message to the fourth vehicle system to direct a controller of the fourth vehicle system to automatically (e.g., without operator intervention) change an operating setting (e.g., release the brake, increase a throttle setting, or the like) to move the fourth vehicle system out of the intersection. Optionally, the control system may remotely control operation of the fourth vehicle system to change an operating setting of the fourth vehicle system. Optionally, the control system may communicate the command message to instruct an operator onboard the fourth vehicle system to manually change an operating setting of the fourth vehicle system. In one or more embodiments, the operating settings may be changed based on a predicted time of arrival of another vehicle system at the intersection. For example, the operating settings may be changed to ensure that the vehicle system is not disposed within the intersection or intersection allowance area by at least the time the other vehicle system arrives at the intersection.

Alternatively, if the portion of the vehicle system does not need to move out of the intersection or intersection allowance area, at step 422 operating settings of the vehicle system may remain the same. For example, the portion of the vehicle system that is disposed within or across the intersection or intersection allowance area may remain within the intersection or intersection allowance area.

Returning to the decision made at step 408, if a portion of a vehicle system is not disposed within or across an intersection or intersection allowance area, flow of the method proceeds toward step 414. At step 414, a predicted time of arrival of a vehicle system at an intersection or intersection allowance area is determined. The time of arrival may be based on a moving speed of the vehicle system, a rate of a changing speed of movement, a location of the vehicle system, a distance between the vehicle system and the intersection or intersection allowance area, an elevation of the intersection (e.g., relative to sea level) relative to an elevation of the vehicle system, or the like.

At step 416, a decision is made whether the time of arrival of a vehicle system at an intersection or intersection allowance area needs to change. For example, referring to FIG. 3, the control system may determine that the first vehicle system moving in the first direction 120 will reach the intersection allowance area of the intersection 130D at a predicted time of arrival T1. The control system may also identify that the fourth vehicle system 108 may move out of the intersection allowance area 130D at a predicted time of departure T2 that is at a time after the predicted time of arrival T1 of the first vehicle system. For example, the first vehicle system is predicted to reach the intersection 130D before the fourth vehicle system has moved out of the intersection allowance area. The control system may determine the predicted time of arrival T1 of the first vehicle system and the predicted time of departure T2 of the fourth vehicle system based on the operating settings of the first and fourth vehicle systems, a location of the first vehicle system, a distance between the first vehicle system and the intersection, a size of the fourth vehicle system, or the like.

In one or more embodiments, the control system may determine that the first vehicle system needs to reach the intersection 130D at a time before the predicted time of arrival T1 based on another vehicle system needing to move through the intersection 130A after the first vehicle system has moved through the intersection 130A. For example, the speed of the first vehicle system may need to increase to allow the seventh vehicle 314 of the first vehicle to move through the intersection allowance area of the intersection 130A before another vehicle system (not shown) reaches the intersection 130A.

In one or more embodiments, the control system may determine that the predicted time of arrival T1 of the first vehicle system at an intersection may need to change based on an obstacle being disposed within or across the intersection. For example, the control system may receive data signals communicated from a wayside device that indicate that an obstacle is disposed within or across the intersection. The data signals may indicate whether the obstacle is stationary or moving, a moving speed of the moving obstacle, a size of the object, a predicted time of departure of the obstacle at which the obstacle is expected to move out of the intersection, or the like. In one or more embodiments, the control system may determine whether a portion of the obstacle (e.g., a portion of the obstacle disposed within an intersection allowance area) may interfere with a portion of the first vehicle system if the first vehicle system reaches the intersection before the obstacle moves out of the intersection allowance area. The control system may determine whether the first vehicle system and obstacle will interfere with each other based on the speed of movement of the obstacle, the size of the obstacle, the moving speed of the first vehicle system, the size of the first vehicle system, or the like.

In one or more embodiments, the control system may receive data signals communicated from a wayside device or other vehicle system that indicate that the obstacle is not disposed at or within an intersection allowance area of an intersection, but may be moving towards the intersection allowance area. The control system may determine a time of arrival of the obstacle at the intersection and/or a time of departure of the obstacle from the intersection based on the moving speed of the obstacle. Optionally, the predicted time of arrival of a vehicle system at an intersection may need to change (e.g., speed up to arrive sooner than the predicted time of arrival or slow down to arrive at a time later than the predicted time of arrival) for an alternative reason.

If the predicted time of arrival T1 of the first vehicle system needs to change, flow of the method proceeds toward step 418. Alternatively, if the predicted time of arrival of the first vehicle system does not need to change, flow of the method proceeds toward step 422 and the first vehicle system continues to operate according to the operating settings.

At step 418, an operating setting of the first vehicle system may be changed in order to change the time of arrival T1 of the first vehicle system at the intersection 130D to a new predicted time of arrival T3. One or more operating settings of the first vehicle system may need to change based on a determination that the first vehicle system will interfere or collide with a portion of the fourth vehicle system. Optionally, the one or more operating settings may need to change based on a determination that the first vehicle system will interfere or collide with another obstacle.

In one embodiment, the control system may communicate a command message to a controller of the first vehicle system (not shown) to direct the controller to automatically change a throttle and/or brake setting of the first vehicle system. Optionally, the control system may remotely control operation of the first vehicle system and may remotely change an operating setting of the first vehicle system. Optionally, the control system may communicate the command message to the controller of the first vehicle system to direct an operator of the first vehicle system to manually change an operating setting of the first vehicle system. At step 420, the vehicle system is operated according to the new operating settings, and arrives at the intersection at a time that is different than the predicted time of arrival T1. For example, the actual time of arrival of the first vehicle system may be at a time that is before or after the predicted time of arrival T1.

In one or more embodiments, the control system may obtain and/or determine a vector projection of movement of the first vehicle system. The vector projection may be based on one or more of a direction of movement of the first vehicle system, the route along which the first vehicle system is or will be moving (e.g., if the first vehicle system is changing routes at an intersection), the moving speed of the first vehicle system, if the moving speed of the vehicle system is changing (e.g., slowing down or speeding up), the predicted time of arrival of a portion of the first vehicle system at the intersection, or the like. The control system may determine whether the first vehicle system will interfere with another vehicle system or an obstacle at the intersection based on the vector projection of movement of the first vehicle system. Optionally, the control system may automatically communicate a command message to the first vehicle system to change an operating setting to change the predicted time of arrival at the intersection based on the vector projection of the first vehicle system.

Figure 5:
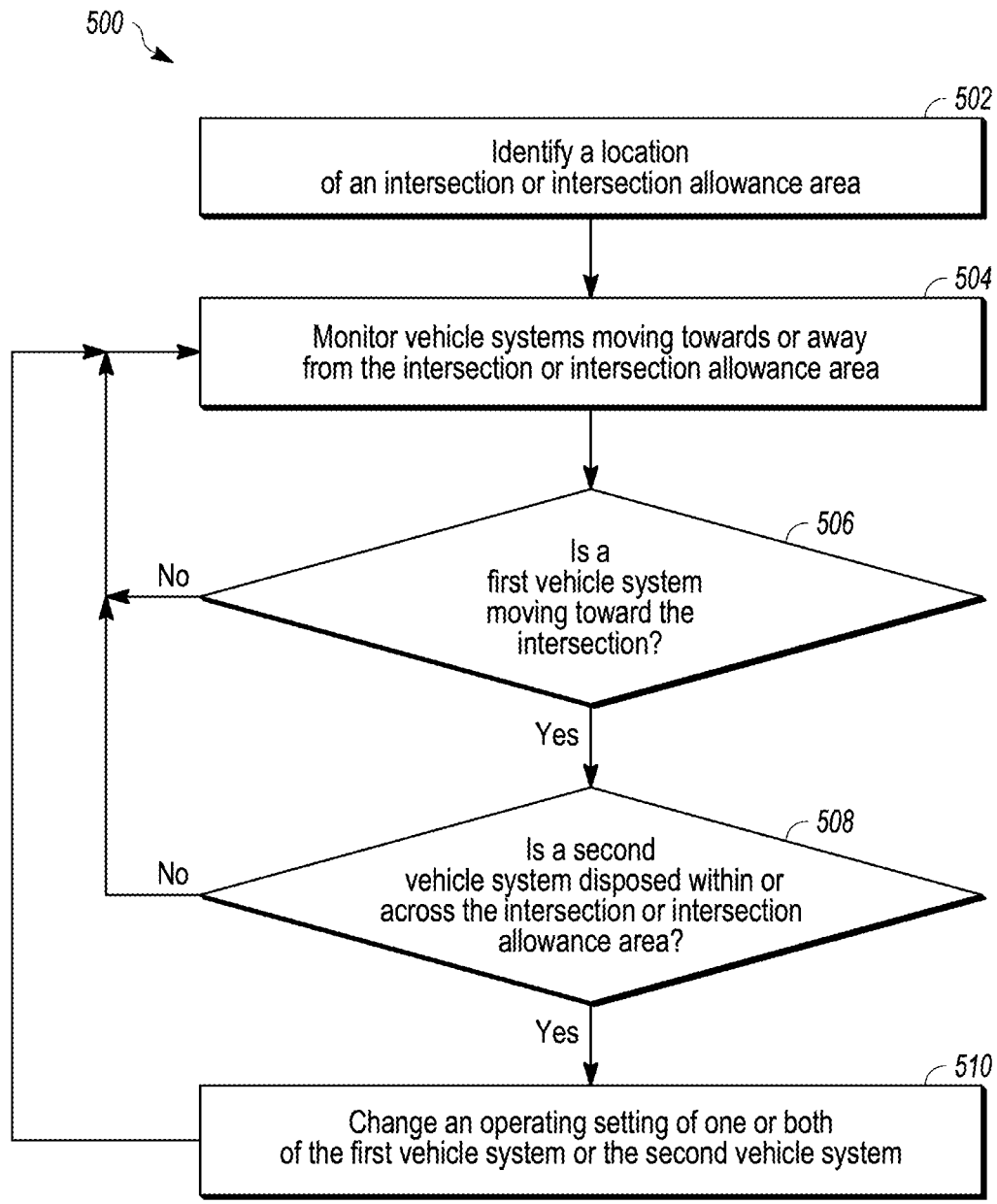
FIG. 5 illustrates a flowchart of one example of controlling operation of vehicles moving along intersecting routes in accordance with one embodiment.

FIG. 5 illustrates a flowchart 500 of another example of controlling operations of vehicle systems moving along intersecting routes. A control system (e.g., control system 100 shown in FIG. 1) may obtain, determine, and/or identify a size of plural different vehicle systems moving along the same and/or intersecting routes. Additionally, the control system may obtain, determine, and/or identify information about the plural different vehicle system (e.g., routes along which the vehicle systems are moving, directions of movement of the vehicle systems, if one or more vehicle systems is stationary, or the like). The control system may receive some of the information related to the plural different vehicle systems from a memory of the control system, from another data storage system accessible by the control system, from wayside devices, from the vehicle systems, or the like.

At step 502, the control system may identify a location of an intersection of two or more routes. The location of the intersection may include an intersection allowance area that includes a threshold distance around the intersection. For example, the intersection allowance area may be an area within about 5 meters of the intersection, within about 10 meters of the intersection, within 50 meters of the intersection, or the like. At step 504, the control system may monitor movement of the plural different vehicle systems moving toward and away from the intersections and intersection allowance areas.

At step 506, a determination is made whether a first vehicle system is moving toward the intersection. If the first vehicle system is not moving toward the intersection, flow of the method returns to step 504 and the control system continues to monitor movement of the vehicle systems. Alternatively, if the first vehicle system is moving toward the intersection, flow of the method proceeds toward step 508.

At step 508, a determination is made whether at least a portion of a second vehicle system (or other obstacle) is disposed within or across the intersection, or disposed within the intersection allowance area. If no portion of the second vehicle system is disposed within or across the intersection or intersection allowance area, flow of the method returns to step 504 and the control system continues to monitor movement of the vehicle systems and the intersections.

Alternatively, if at least a portion of the second vehicle system is disposed within or across the intersection or intersection allowance area, flow of the method proceeds toward step 510. At step 510, one or more operating settings of one or both of the first or second vehicle systems are changed based on at least a portion of the second vehicle system being disposed within the intersection allowance area or across the intersection and the first vehicle system moving toward the intersection. For example, operating settings of one or both of the first or second vehicle systems may need to change to avoid the first and second vehicle systems colliding with each other at the intersection or within the intersection allowance area.

In one embodiment, a speed of movement of the second vehicle system may be increased to move the second vehicle system out of the intersection allowance area before a time of arrival of the first vehicle system at the intersection allowance area. Optionally, a brake setting of the first vehicle system may need to change, such as to slow or stop movement of the first vehicle system. For example, the speed of movement of the first vehicle system may be reduced to change the predicted time of arrival of the first vehicle system at the intersection to a time that is after a time of departure of the second vehicle system from the intersection allowance area. Flow of the method may return to step 504 and the control system may continue to monitor plural vehicle systems moving along plural different routes and intersections of the plural different routes.

In one or more embodiments, a method includes obtaining a size of a vehicle system, identifying locations of different portions of the vehicle system, and determining one or more of a) whether the vehicle system is disposed within or across an intersection of routes of b) a predicted time of arrival at which the vehicle system will be disposed within or across the intersection based on the size of the vehicle system and the locations of the different portions of the vehicle system.

Optionally, the method may include measuring a moving speed of the vehicle system, determining a location of the intersection, and determining one or more of a predicted time of departure of the vehicle system from the intersection or the predicted time of arrival of the vehicle system based on the speed of movement of the vehicle system and the location of the intersection. Optionally, the vehicle system may be disposed within or across the intersection, and the method may include automatically communicating an alert to an operator of one or more of the vehicle system or another vehicle system responsive to determining that the vehicle system is disposed within or across the intersection. Optionally, the vehicle system may be disposed within or across the intersection, and the method may include automatically controlling operation of the vehicle system to move the vehicle system out of the intersection. Optionally, the method may include receiving communication from a wayside device that an obstacle is disposed within or across the intersection. Optionally, the communication may indicate one or more of a moving speed of the obstacle, a size of the obstacle, or a predicted time of departure of the obstacle at which the obstacle is expected to move out of the intersection. Optionally, the method may include determining whether a portion of the obstacle will interfere with at least one of the different portions of the vehicle system within the intersection based on one or more of the speed of movement of the obstacle, the size of the obstacle, or the size of the vehicle system.

Optionally, one or more operating settings of the vehicle system may be changed in order to change the predicted time of arrival of the vehicle system at the intersection to a new time of arrival based on the obstacle disposed within or across the intersection. Optionally, a time at which the obstacle is expected to move out of the intersection may be determined, and the one or more operating settings of the vehicle system may be changed to change the predicted time of arrival of the vehicle system at the intersection to the new time of arrival, the new time of arrival being at a time that is after the obstacle has moved out of the intersection. Optionally, a vector projection of the vehicle system based on one or more of a direction of movement of the vehicle system, a route along which the vehicle system moves, a moving speed of the vehicle system, or the predicted time of arrival of the vehicle system at which the vehicle system will be disposed within or across the intersection may be obtained, and the vector projected of the vehicle system may be used to determine whether the vehicle system will interfere with an obstacle at the intersection. Optionally, a command message may be communicated to the vehicle system to change one or more operating settings of the vehicle system to change the predicted time of arrival of the vehicle system at the intersection to a new time of arrival responsive to determining that the vehicle system will interfere with the obstacle based on the vector projection of the vehicle system. Optionally, an intersection allowance area that includes the intersection and a threshold distance around the intersection may be determined, and a) it may be determined whether the vehicle system is disposed within or across the intersection allowance area, or b) the predicted time of arrival at which the vehicle system will be disposed within or across the intersection allowance area may be determined.

In one or more embodiments, a system includes a controller comprising one or more processors that can obtain a size of a vehicle system. The processors identify locations of different portions of the vehicle system, and determine one or more of a) whether the vehicle system is disposed within or across an intersection of routes or b) a predicted time of arrival at which the vehicle system will be disposed within or across the intersection based on the size of the vehicle system and the locations of the different portions of the vehicle system.

Optionally, the one or more processors may measure a moving speed of the vehicle system and determine a location of the intersection, and determine one or more of a predicted time of departure of the vehicle system from the intersection, or the predicted time of arrival of the vehicle system at the intersection based on the speed of movement of the vehicle system and the location of the intersection. Optionally, the processors may automatically communicate an alert to an operator of one or more of the vehicle system or another vehicle system responsive to determining that at least one of the different portions of the vehicle system is disposed within or across the intersection. Optionally, the controller may be communicatively coupled with a wayside device including one or more sensors. The controller may receive data signals from the wayside device indicative of an obstacle disposed within the intersection. Optionally, the processors may change one or more operating settings of the vehicle system to change the predicted time of arrival of the vehicle system at the intersection to a new time of arrival based on the obstacle disposed within or across the intersection. Optionally, the processors may obtain a vector projection of the vehicle system based on one or more of a direction of movement of the vehicle system, a route along which the vehicle system moves, a moving speed of the vehicle system, or the predicted time of arrival at which the vehicle system will be disposed within or across the intersection. The processors may determine whether the vehicle system will interfere with an obstacle at the intersection based at least in part on the vector projection of the vehicle system.

Optionally, the processors may communicate a command message to the vehicle system to change one or more operating settings of the vehicle system to change the predicted time of arrival at which the vehicle system will be disposed within or across the intersection responsive to determining that the vehicle system will interfere with the obstacle based on the vector projection of the vehicle system.

In one or more embodiments, a method includes identifying locations of different portions of a first vehicle system, identifying a location of an intersection allowance area of routes that includes an intersection of the routes and a threshold distance around the intersection, and obtaining a speed of movement of the first vehicle system and a speed of movement of a second vehicle system. The method may include determining whether at least one or more different portions of the first vehicle system is disposed within the intersection allowance area, and determining a) a predicted time of arrival at which the second vehicle system will be disposed within the intersection allowance area and b) a predicted time of departure at which the at least one of the different portions of the first vehicle system will move out of the intersection allowance area based on one or more of the location of the intersection allowance area, the speed of movement of the first vehicle system, or a speed of movement of the second vehicle system responsive to determining that at least one of the different portions of the first vehicle system is disposed within the intersection allowance area. One or more operating settings of one or more of the first vehicle system or the second vehicle system may be changed to one or more of a) move the first vehicle system out of the intersection allowance area, or b) change the predicted time of arrival at which the second vehicle system will be disposed within or across the intersection.

Optionally, the controller may compare a size (width) of a vehicle system with a width of an intersection. In one embodiment, the controller obtains a turning radius of the vehicle system based at least in part on the vehicle system size. The controller may then compare the turning radius to the size of the intersection and respond by controlling the vehicle system based at least in part on the comparison.

In one embodiment, the controllers or systems described herein may have a local data collection system deployed that may use machine learning to enable derivation-based learning outcomes. The controllers may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle control and behavior analytics, and the like.

In one embodiment, the controllers may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan or vehicle operation for a vehicle group, data from various sensors, and location and/or position data. The neural network can be trained to generate an output based on these inputs, with the output representing an action or sequence of actions that the vehicle group should take to accomplish the trip plan or vehicle operation. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and clauses, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and clauses, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The clauses define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:

identifying locations of plural vehicles of a multi-vehicle system relative to a route along which the multi-vehicle system is configured to move, the multi-vehicle system comprising the plural vehicles configured to move together along the route;

identifying a location of an intersection of routes including the route along which the multi-vehicle system is configured to move;

determining which portion of which vehicle of the multi-vehicle system is disposed within or across an intersection of routes including the route along which the multi-vehicle system is configured to move based at least in part on the identified locations of the plural vehicles of the multi-vehicle system;

determining a portion of the vehicle system disposed within or across the intersection of routes;

determining an intersection allowance area that includes the intersection and an intersection threshold distance around the intersection;

determining which vehicle of the multi-vehicle system is disposed within or across the intersection threshold distance or within or across the intersection based on the identified locations of the plural vehicles of the multi-vehicle system;

determining (a) a predicted time of arrival at which a second vehicle system will be disposed within the intersection allowance area; and (b) a predicted time of departure at which the portion of the vehicle of the multi-vehicle system will move out of the intersection allowance area based on one or more of the location of the intersection allowance area, speed of movement of the multi-vehicle system, or the speed of movement of the second vehicle system responsive to determining that the portion of the vehicle of the multi-vehicle system is disposed within the intersection allowance area; and communicating a command message to the multi-vehicle system to change one or more of a brake setting or a propulsion setting of the multi-vehicle system to move the multi-vehicle system out of the intersection based at least in part on the identification of the location of the vehicle that is disposed within or across the intersection of the routes and within or across the intersection threshold distance.

2. The method of claim 1, further comprising:
measuring a moving speed of the multi-vehicle system;
determining a location of the intersection; and
determining a predicted time of departure of the multi-vehicle system from the intersection based on the moving speed of the multi-vehicle system and the location of the intersection.

3. The method of claim 1, further comprising automatically communicating an alert to an operator of one or more of the multi-vehicle system or another vehicle system responsive to determining that the at least one vehicle of the multi-vehicle system is disposed within or across the intersection.

4. The method of claim 1, further comprising receiving communication from a wayside device that an obstacle is moving towards the intersection.

5. The method of claim 4, wherein the communication indicates one or more of a moving speed of the obstacle, a size of the obstacle, a predicted time of arrival of the obstacle at which the obstacle is expected to be disposed within or across the intersection, or a predicted time of departure of the obstacle at which the obstacle is expected to move out of the intersection.

6. The method of claim 5, further comprising:
determining that a portion of the obstacle will interfere with the vehicle of the multi-vehicle system that is disposed within or across the intersection based on one or more of the moving speed of the obstacle or the size of the obstacle.

7. The method of claim 4, further comprising:
changing the one or more of the brake setting or the propulsion setting of the multi-vehicle system to change a predicted time of departure of the multi-vehicle system from the intersection to a new time of departure based on the obstacle moving towards the intersection.

8. The method of claim 1, further comprising:
obtaining a vector projection of the multi-vehicle system based on one or more of a direction of movement of the multi-vehicle system, the route along which the multi-vehicle system moves, or a moving speed of the multi-vehicle system; and determining that the multi-vehicle system will interfere with the second vehicle system at the intersection based on the vector projection of the multi-vehicle system and the predicted time of arrival of the second vehicle system at the intersection of the routes.

9. The method of claim 8, further comprising:
communicating the command message to the multi-vehicle system to change the one or more of the brake setting or the propulsion setting of the multi-vehicle system to change a predicted time of departure of the multi-vehicle system from the intersection to a new time of departure; and communicating a command message to the second vehicle system to change one or more of a brake setting or a propulsion setting of the second vehicle system to change the predicted time of arrival of the second vehicle system at the intersection of the routes responsive to determining that the multi-vehicle system will interfere with the second vehicle system based on the vector projection of the multi-vehicle system.

10. A system comprising:

one or more processors configured to identify locations of plural vehicles of a multi-vehicle system relative to a route along which the multi-vehicle system is configured to move, the plural vehicles of the multi-vehicle system configured to move together along a route, the one or more processors configured to identify a location of an intersection of routes including the route along which the multi-vehicle system is configured to move, the one or more processors configured to determine which vehicle of the plural vehicles of the multi-vehicle system are disposed within or across the intersection of the routes based at least in part on the identified locations of the plural vehicles of the multi-vehicle system and the location of the intersection of the routes, the one or more processors configured to determine an intersection allowance area that includes the intersection and an intersection threshold distance around the intersection;

the one or more processors configured to determine which vehicle of the multi-vehicle system is disposed within or across the intersection threshold distance or within or across the intersection based on the identified locations of the plural vehicles of the multi-vehicle system; and responsive to determining which vehicle of the multi-vehicle system is disposed within or across the intersection threshold distance, the one or more processors configured to communicate a command message to the multi-vehicle system to automatically change one or more operating settings of the multi-vehicle system to move the plural vehicles of the multi-vehicle system out of the intersection of the routes based on which vehicle of the plural vehicles of the multi-vehicle system is disposed within or across the intersection of the routes, the locations of the plural vehicles, the intersection allowance area, and the location of the intersection of the routes.

11. The system of claim 10, wherein the one or more processors are configured to measure a moving speed of the multi-vehicle system, the one or more processors configured to determine one or more of a predicted time of departure of the multi-vehicle system from the intersection or a predicted time of arrival of the multi-vehicle system at which one or more other vehicles of the plural vehicles of the multi-vehicle system will be disposed within or across the intersection based on the moving speed of the vehicle system and the location of the intersection.

12. The system of claim 10, wherein the one or more processors are configured to automatically communicate an alert to an operator of one or more of the multi-vehicle system or another vehicle system responsive to determining which vehicle of the plural vehicles of the multi-vehicle system is disposed within or across the intersection.

13. The system of claim 10, wherein the one or more processors are communicatively coupled with a wayside device comprising one or more sensors, the one or more processors are configured to receive data signals from the wayside device indicative of an obstacle moving towards the intersection.

14. The system of claim 13, wherein the one or more processors are configured to automatically change the one or more operating settings of the multi-vehicle system to change a predicted time of departure of the of the plural vehicles of the multi-vehicle system from the intersection to a new time of departure based on the obstacle moving towards the intersection.

15. The system of claim 10, wherein the one or more processors are configured to obtain a vector projection of the multi-vehicle system based on one or more of a direction of movement of the multi-vehicle system, the route along which the multi-vehicle system moves, or a moving speed of the multi-vehicle system, wherein the one or more processors are configured to determine that the multi-vehicle system will interfere with an obstacle at the intersection based at least in part on the vector projection of the multi-vehicle system.

16. A method comprising:
identifying locations of different portions of a first multi-vehicle system with one or more processors;

identifying, with the one or more processors, a location of an intersection allowance area of routes, the intersection allowance area including an intersection of the routes and a threshold distance around the intersection;

obtaining a speed of movement of the first multi-vehicle system and a speed of movement of a second vehicle system with the one or more processors;

determining, with the one or more processors, that at least one portion of a first vehicle of the first multi-vehicle system is disposed within the intersection allowance area;

determining which vehicle of the first multi-vehicle system is disposed within or across the intersection threshold distance or within or across the intersection based on the identified locations of the vehicles of the first multi-vehicle system;

determining, with the one or more processors, (a) a predicted time of arrival at which the second vehicle system will be disposed within the intersection allowance area; and (b) a predicted time of departure at which the at least one portion of the first vehicle of the first multi-vehicle system will move out of the intersection allowance area based on one or more of the location of the intersection allowance area, the speed of movement of the first multi-vehicle system, or the speed of movement of the second vehicle system responsive to determining that the at least one portion of the first vehicle of the first multi-vehicle system is disposed within the intersection allowance area;

determining the first vehicle needs to move or the second vehicle needs to change arrival time; and based on determining the first vehicle needs to move or the second vehicle needs to change the arrival time, communicating a command message to the one or more of the first multi-vehicle system or the second vehicle system to change one or more brake settings or propulsion settings of one or more of the first multi-vehicle system or the second vehicle system or a direction of movement of one or more of the first multi-vehicle system or the second vehicle system based on which vehicle of the multi-vehicle system is disposed within or across the intersection threshold distance to one or more of (a) move the at least one portion of the first vehicle of the first multi-vehicle system out of the intersection allowance area or (b) change the predicted time of arrival at which the second vehicle system will be disposed within or across the intersection with the one or more processors.

17. The method of claim 16, wherein the at least one portions comprise at least one of locations of corner or side of the vehicle system, top portion or bottom portion of the vehicle system, location of components of the vehicle system, or a portion of cargo extending beyond the size of the vehicle.

18. The method of claim 17, determine a distance within the intersection allowance area that the portion of the vehicle system extends.

* * * * *